United States Patent [19]

Maxwell

[11] 4,252,283
[45] Feb. 24, 1981

[54] ELECTRONIC THERMOGRAPH

[75] Inventor: William H. Maxwell, Los Angeles, Calif.

[73] Assignee: Time & Temperature Company, Los Angeles, Calif.

[21] Appl. No.: 3,298

[22] Filed: Jan. 15, 1979

Related U.S. Application Data

[62] Division of Ser. No. 747,013, Dec. 2, 1976, Pat. No. 4,135,400.

[51] Int. Cl.³ .......................................... B65H 17/04
[52] U.S. Cl. ............................ 242/67.1 R; 346/136; 242/67.3 R
[58] Field of Search ............ 242/67.1 R, 67.2, 67.3 R, 242/67.3 F, 67.4, 67.5; 346/136, 145; 40/471, 470, 473, 385, 483, 485, 514, 515, 518; 73/343.5

[56] References Cited

U.S. PATENT DOCUMENTS

| 2,398,226 | 4/1946 | Holland | 40/471 |
|---|---|---|---|
| 3,743,201 | 7/1973 | Tarantino et al. | 242/67.3 R |
| 3,787,885 | 1/1974 | Johnson | 346/136 |
| 3,934,835 | 1/1976 | Maxwell | 346/136 X |
| 4,074,275 | 2/1978 | Stires | 346/136 X |

Primary Examiner—John M. Jillions
Attorney, Agent, or Firm—William H. Maxwell

[57] ABSTRACT

A thermograph adapted to be pre-loaded with chart paper upon which shipping information can be written, and comprising an instrument unit enclosed in an expendable container for automatic operation and security assured by a seal, the instrument being electro-mechanical wherein solid state circuitry horoligically controls a prime mover to advance the chart on a time basis and including a chassis over which the chart is guided onto a spool journaled therein, and a spool drive carrier depending from the chassis and keyed into alignment with and having a motor and gear drive to the spool.

7 Claims, 17 Drawing Figures

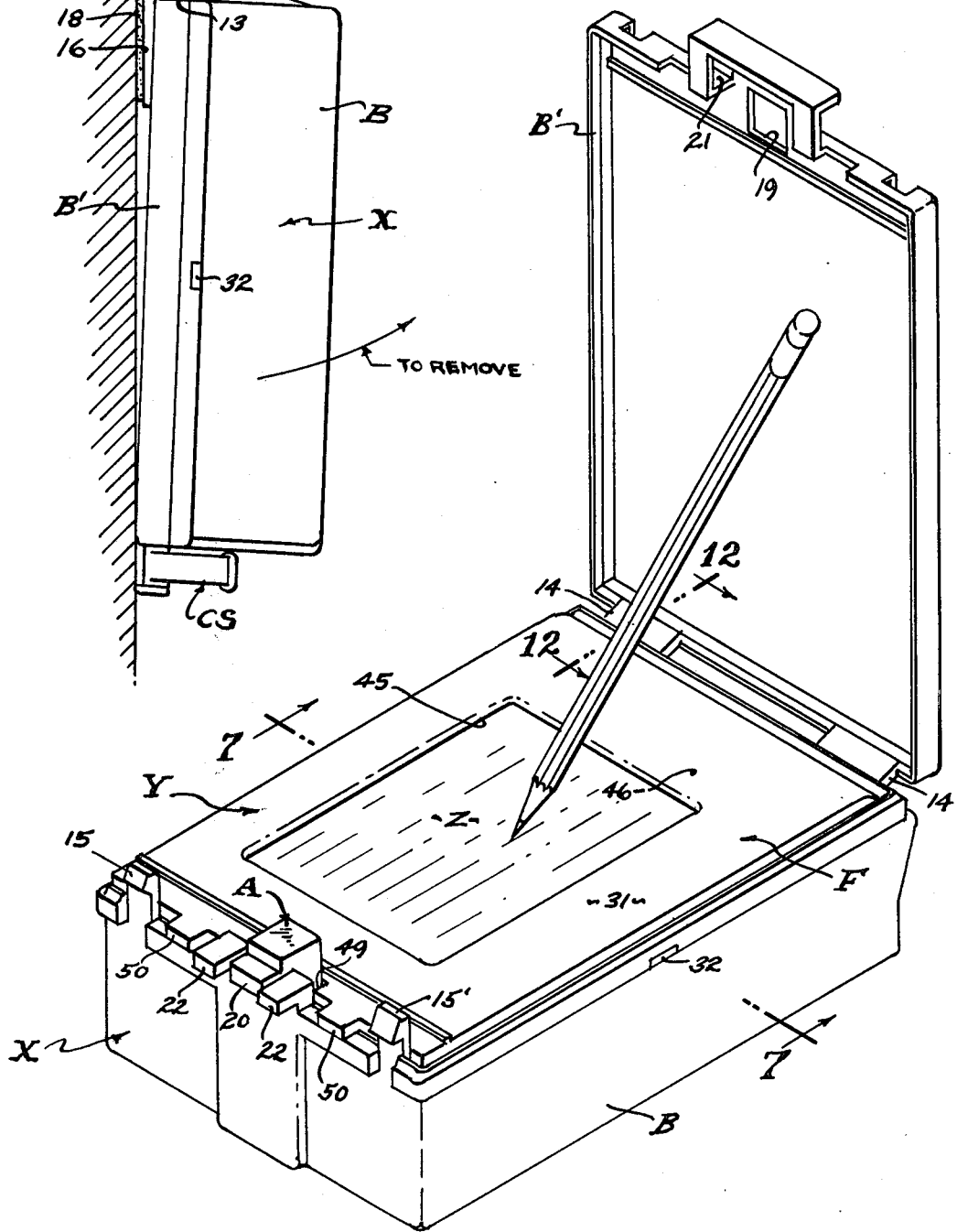

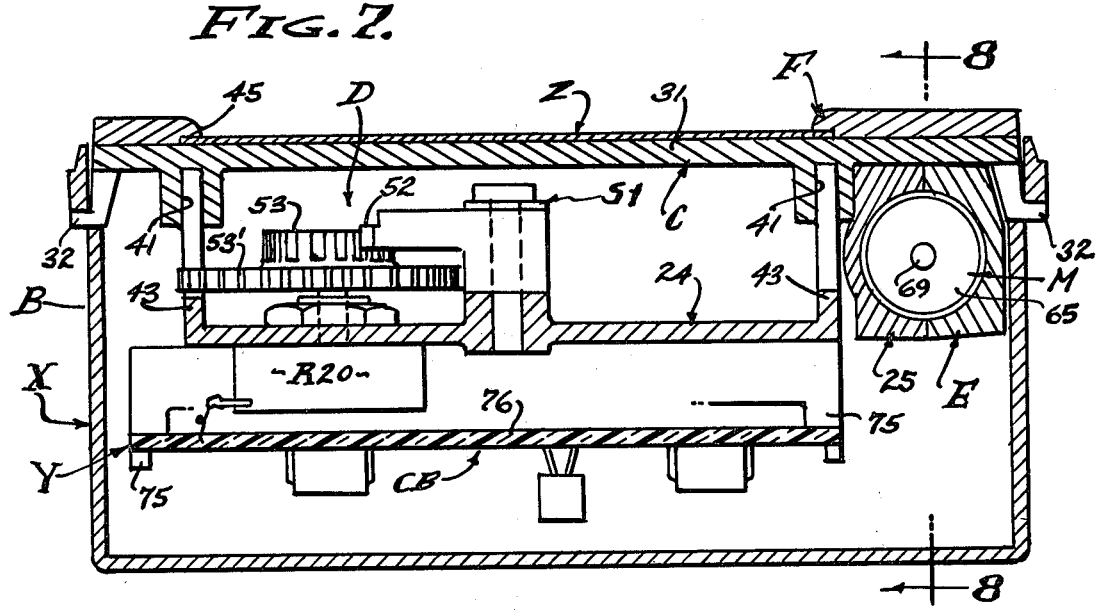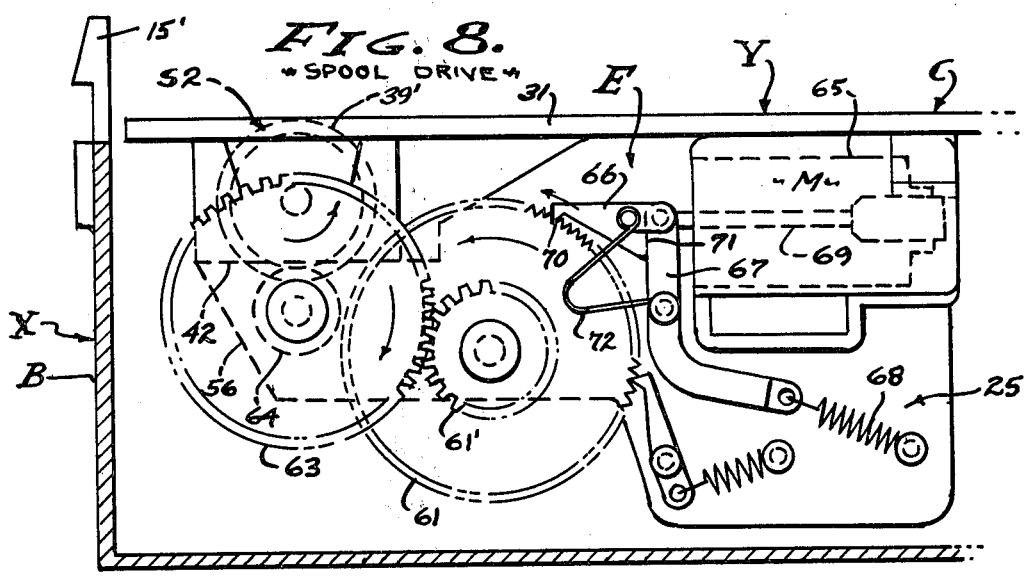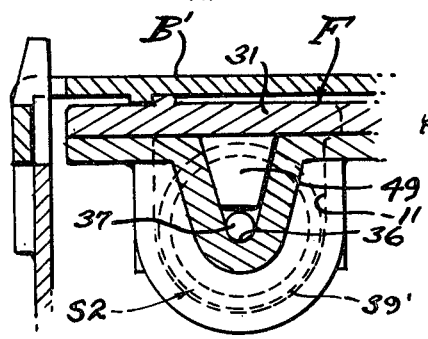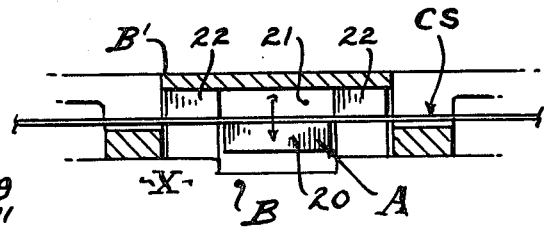

"STOP"

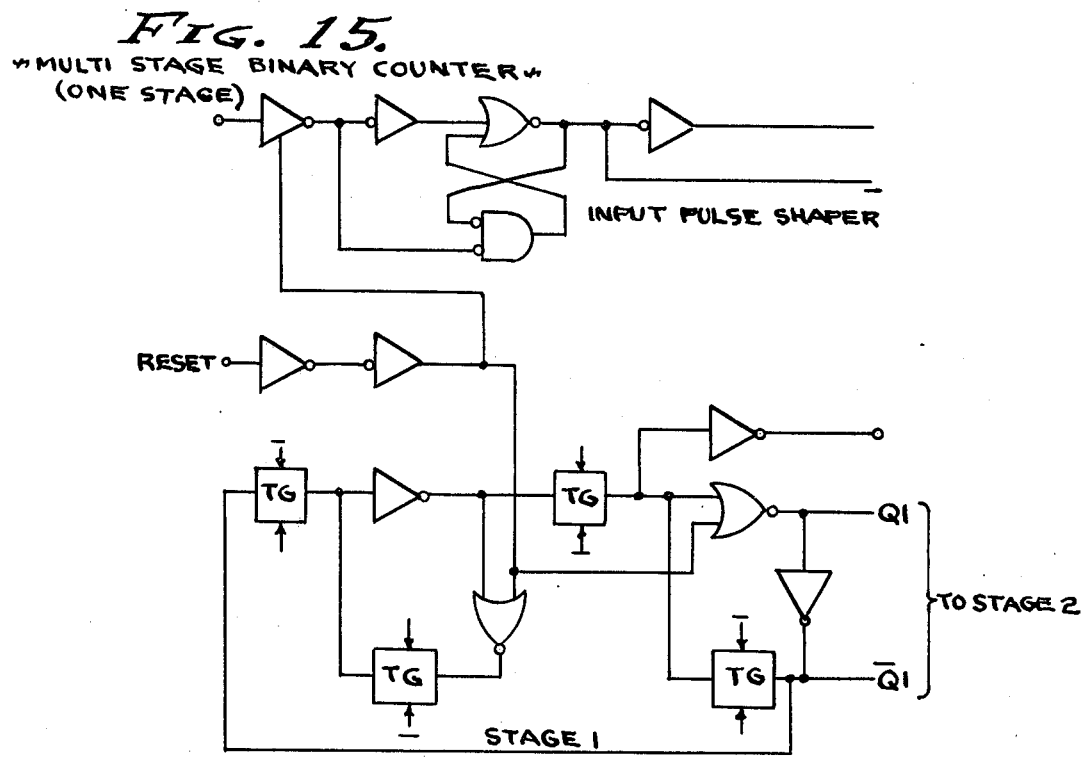
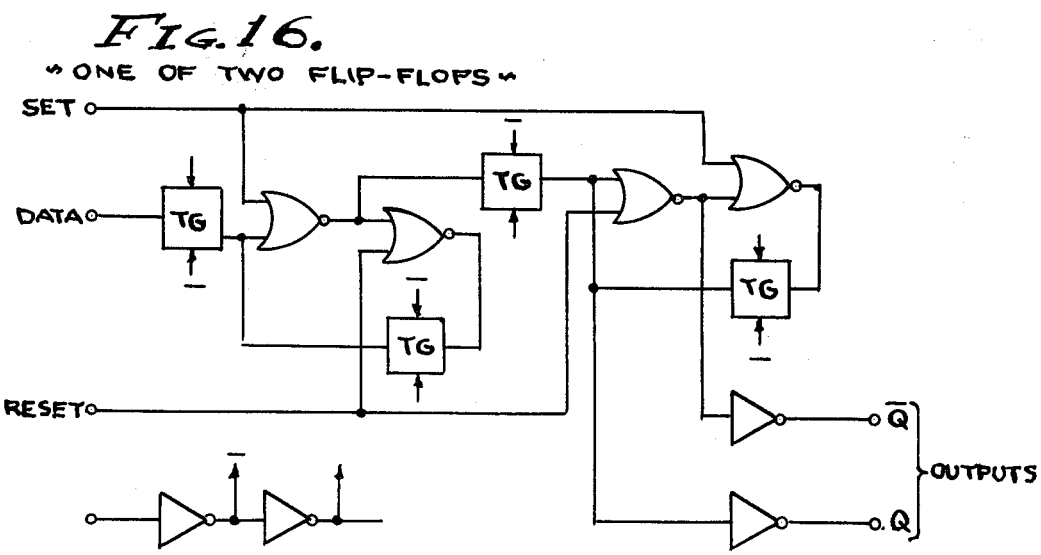

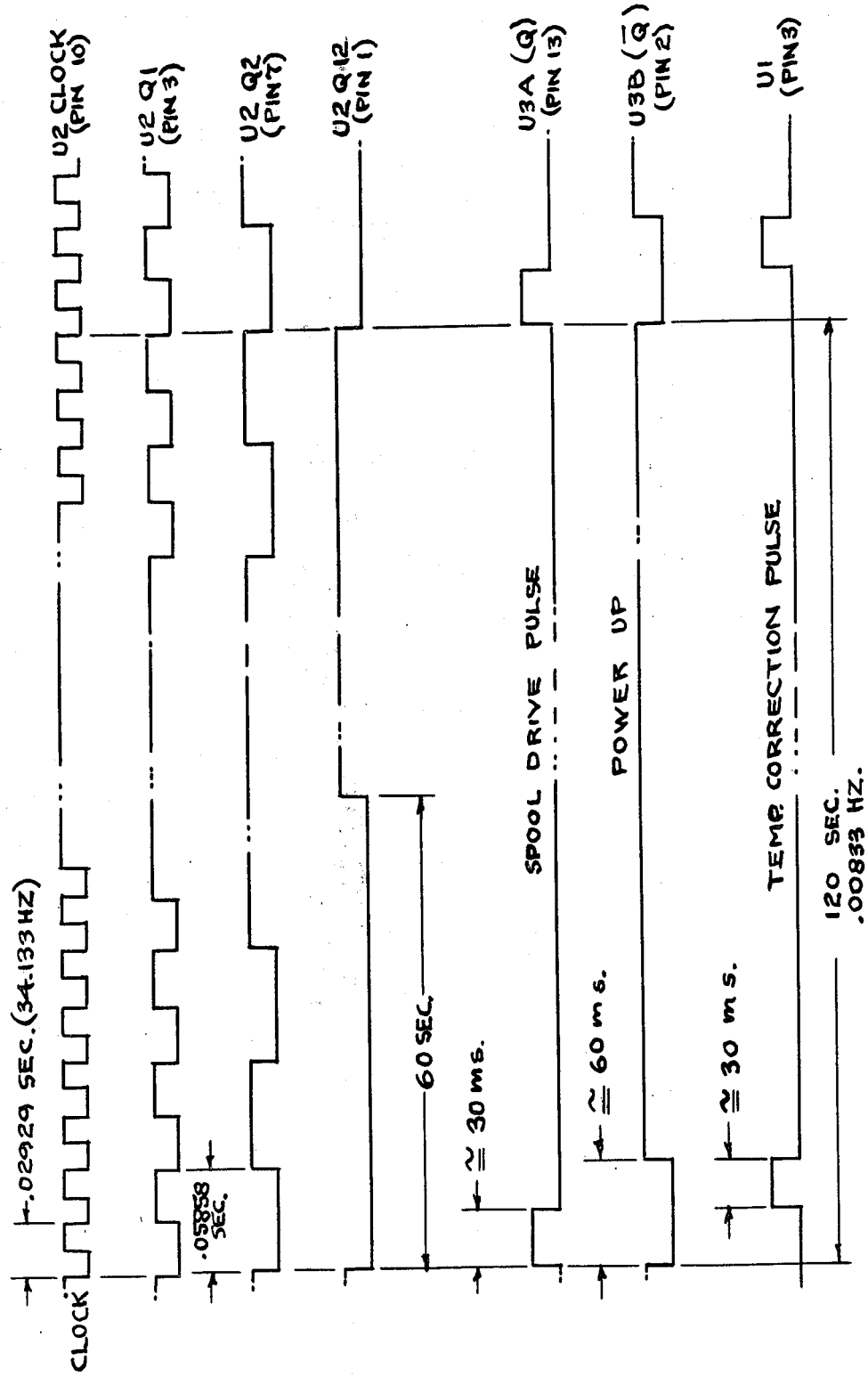

ELECTRONIC THERMOGRAPH

This is a division of application Ser. No. 747,013 entitled Electronic Thermograph filed Dec. 2, 1976 now U.S. Pat. No. 4,135,400.

BACKGROUND

Thermographs of the type for monitoring perishables and the like have been characterized by clock movement drives and bi-metal thermometers, both of which are subject to unreliability, the former susceptible to abuse and the latter prone to inaccurate calibration. Clock movements are delicate at best, they involve a considerable amount of mechanism and are inherently weighty with accuracy always in doubt. Therefore, it is a general object of this invention, to provide a most durable thermograph not subject to normal abuse or inaccuracy, and accordingly this reliability is accomplished by use of solid state electronics and primary motor drives.

Heretofore, the functions of temperature readout and time advancement have been independent, although associated in the one instrument. With the present invention, it is an object to cooperatively associate the time and temperature functions whereby one is dependent upon the other. Battery power is feasible at refrigeration temperature (40° F.), and also at freezer temperature ($-10°$ F.), and it is an electronic circuitry and stepper motor drive for operation at both refrigeration and freezer temperatures which is an object of this invention. With this invention, a time base is established electronically and employed for both chart advancement and stylus positioning. In other words, solid state electronics is employed in a logic applied to both time and temperature, and involving generally means for establishing a time base employed to actuate a prime mover to incrementally advance a chart and also to trigger means to actuate a prime mover that positions a stylus according to prevailing temperature.

Physically, size and weight is of prime concern due to the ever increasing costs of transport, and to this end it is an object to provide a small light weight instrument, and in this respect the major functions of this instrument are incorporated in a light weight embodiment controlled by a printed circuit board utilizing solid state elements and integrated circuits. And being electronically oriented, the chart prime mover and stylus positioning means are electrically operated from a battery power supply and preferably by means of stepper motors. In practice, a nine volt alkaline battery is employed and the stepper motors are 100 ohm solenoids that operate ratchet pawls for angular displacement of gear transmission means to a chart take-up spool and recording stylus, respectively.

Longevity of the instrument use is of prime concern, being implemented for use periods extended from several days to a month or more. That is, the expected use is continuous and is repeated several or more consecutive times during the life of the instrument. This light weight instrument has a small power supply in the form of a battery from which energy is taken for instrument operation, and consequently conservation of this power is an important factor and a primary object of this invention. To this end the instrument is operated at widely separated intervals by momentary pulses of short duration, for example at two minute intervals with 30 millisecond pulses, and to the end that the operational time is 1/4000 of the total "ON" time. Further to this end, semiconductors of a type requiring minimal power for instrument operation are employed, namely Complementary Metal Oxide Semiconductors referred to generally as CMOS system integrated circuits or IC's having minimum voltage characteristics, and with the result that there is minimized battery drain for total system operation.

It is an object of this invention to improve the accuracy of thermograph recordings, with the realization that bi-metal thermometers have their limitations with respect to calibration. At best, a commercially produced bi-metallic element has a tolerance of a percent or two within the range of its operation, and this factor alone accounts for unpredictable discrepancies in excess of several degrees in temperature readout. For example, a bi-metal thermometer calibrated at one temperature is likely to be out of calibration at another temperature, and this discrepancy will increase with the differential between temperature readings. On the contrary, electronic response to temperature change can be far more accurate and linear with respect to temperature differential, and calibration made accurate at all temperature readouts within the range of the instrument. Although the instrument under consideration is intended for accuracy within one degree F., it is to be understood that far greater resolution can be attained with the concept herein disclosed.

It is another object to provide a positive stylus drive for recording temperatures, which obviates readout discrepancies incurred with the usual flexible bi-metal means of the prior art. Heretofore, chart movement has adversely affected stylus position, due to frictional engagement of the stylus arm angularly disposed to chart movement. With the present invention, stylus position is a purely electro-mechanical function in no way affected by chart movement and frictional engagement of the stylus therewith.

It is still another object of this invention to provide a thermograph that responds to the prevailing temperature with servo positioning of the thermometer means, and conceptually a electronic combination comprised generally of a sensor that produces a voltage responsive to temperature and a transmitter that produces a voltage responsive to position of the thermometer means. In accordance with this invention, these voltages are compared and the nature of any error detected and discriminantly switched to drive means for positioning of the thermometer means to correspond to the prevailing temperature.

Thermographs of the type under consideration are prepared for logistics that involve the transport of perishables from grower-shipper to receiver via a public carrier. Generally, the goods are sent by truck or rail and also by boat or air to a consignee who must hurridely inspect the shipment before acceptance; and it is the temperature condition during transport which is a determining factor when there is a question as to continuity and degree of refrigeration during the trip. Battery operated pre-loaded instruments have been provided for this purpose, that is instruments loaded with chart paper and prepared to operate when desired. It is an object therefore, to provide a pre-loaded instrument that automatically starts to operate when closed and sealed, that continues to reliably operate until opened and from which the chart recording is readily withdrawn for viewing, and that automatically ceases to operate when the seal is broken for removal and access for said chart removal, and further an instrument which is then adapted to economical mail return to a refurbishing service to be prepared for reuse.

An object of this invention is to provide a chassis based instrument adapted to be prepared and/or serviced and installed in a shipping and mail-back housing or container that is expendable. In practice, an injection molded plastic box and cover is provided, into which the instrument chassis is protectively installed. It is also an object to seal this box and cover combination with a metal strip or conventional car seal that assures instrument operation when installed, and to stop the instrument when removed. To this end, a manually depressible actuator is accessible through the cover and which requires depression for insertion of the said car seal. It is also another object to provide a recording instrument that carries with it a mounting bracket from which it can be readily removed; a hinged bracket and adhesive pad that is expendable and from which the instrument is removed as a unit with facility.

SUMMARY OF THE INVENTION

The electronic thermograph hereinafter disclosed in detail comprises generally, a box closed by a cover hinged to one end of the box and snapped thereto by a detent at the other end. The instrument mechanism is carried by a chassis releasably inserted into the box and carrying with it the electronic circuit, the stylus with its drive, and the spool with its drive. The chassis is cooperatively related to the box so as to form a chart supply bin and carries a framer that establishes a chart guideway therebetween, there being a pocket in the chassis remote from the bin to receive the spool. A manually depressible actuator is carried by the chassis and exposed through an opening through the cover, to close a switch, held closed by a strap seal until removal. The electronic circuit is actuated by the closed switch to periodically actuate the spool drive and stylus drive when required. As shown, the spool drive comprises a single ratchet operated stepper wheel and gear means to the spool, while the stylus drive comprises a double ratchet operated stepper wheel and gear means to the stylus. The ratchets are operated by electro magnets or solenoids that advance pawls retracted by spring means, in the case of the spool drive to revolve the spool in a direction to advance the chart, and in the case of the stylus drive to both advance and retract the temperature position of said stylus.

A feature of logistics, that is the instrument rental service to shipper and via public carrier to receiver and return to said service source, is unique with this instrument which employs a conventional metal strap "car seal" that is inserted by the shipper to seal the instrument and simultaneously maintain a closed electrical circuit manually initiated by the shipper in order to insert the said metal strap seal. When the seal is removed by the receiver, the circuit is broken, deactivating the instrument for return in the mails. The seal is simply discarded by the receiver.

Referring now to the electronics, a temperature responsive sensor varies a voltage to be compared with the voltage output of a transmitter positioned by movement of a temperature recording stylus. A time base and programmer means provides a pulse at intervals during which power consuming functions take place, with the result that the instrument is said to be "ON" but a part of the total time. When the circuit is activated by said pulse, a comparator means sums the voltages of the temperature responsive sensor and position responsive transmitter, and any error is detected by a discriminator and switch means to advance or retract stepper motors that reposition the potentiometer and stylus.

DRAWINGS

The various objects and features of this invention will be fully understood from the following detailed description of the typical preferred form and application thereof, throughout which description reference is made to the accompanying drawings, in which:

FIG. 2 is a side elevation illustrating installation of the thermograph.

FIG. 3 is a perspective view similar to FIG. 1 illustrating the thermograph opened for the reception of shipper information.

FIG. 7 is an enlarged transverse sectional view taken as indicated by line 7—7 on FIG. 3.

FIG. 8 is a fragmentary sectional view taken as indicated by line 8—8 on FIG. 7.

FIG. 9 is a detailed sectional view taken as indicated by line 9—9 on FIG. 6.

FIG. 10 is a detailed sectional view taken as indicated by line 10—10 on FIG. 1.

FIG. 15 is a logic diagram of one stage of the binary counter.

FIG. 16 is a logic diagram of one of the two identical flip-flops. And,

FIG. 17 is a timing diagram illustrating the clock and pulse relationships of the electronic circuit.

PREFERRED EMBODIMENT

Figure 1:
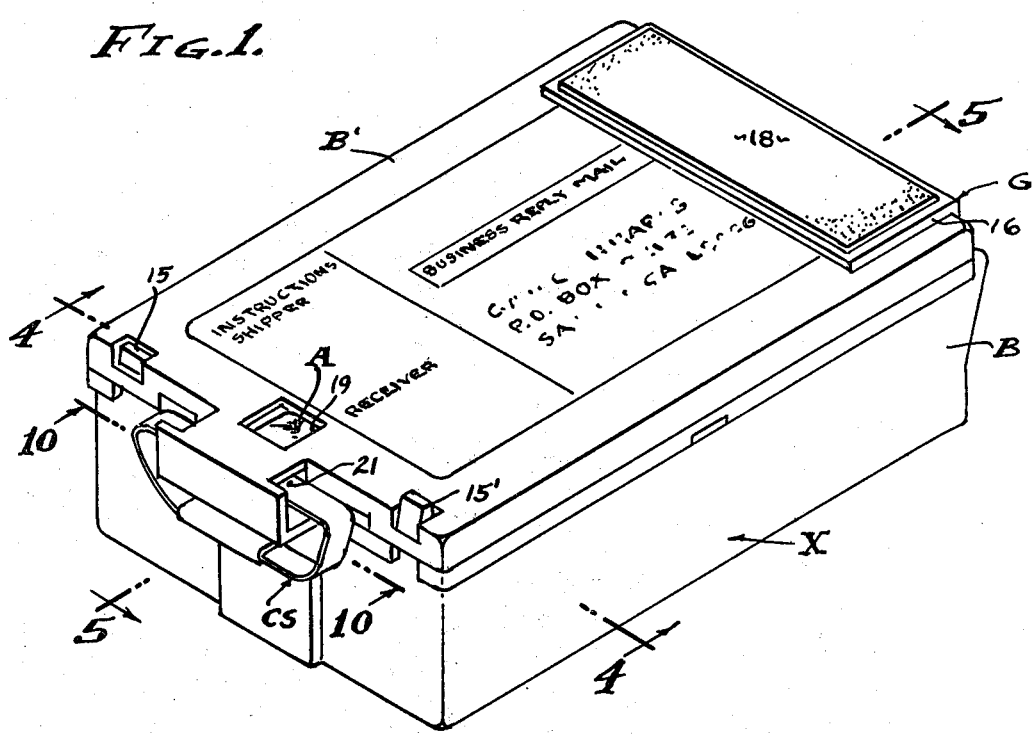
FIG. 1 is a perspective view of the electronic thermograph sealed for operation and shipment.
Figure 4:
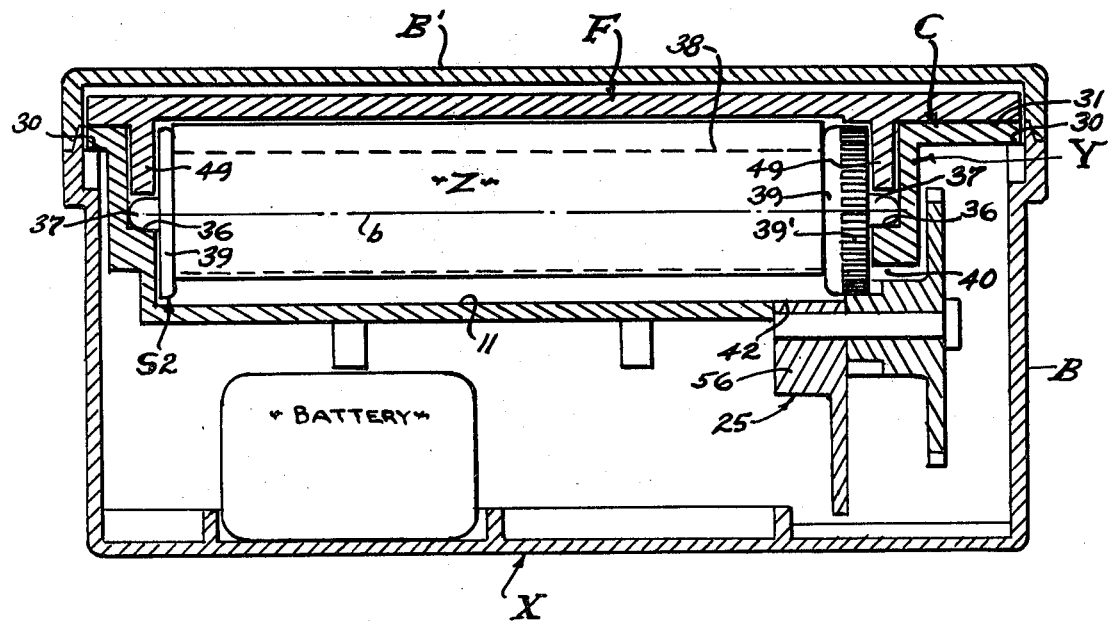
FIG. 4 is an enlarged transverse sectional view taken as indicated by line 4—4 on FIG. 1.
Figure 5:
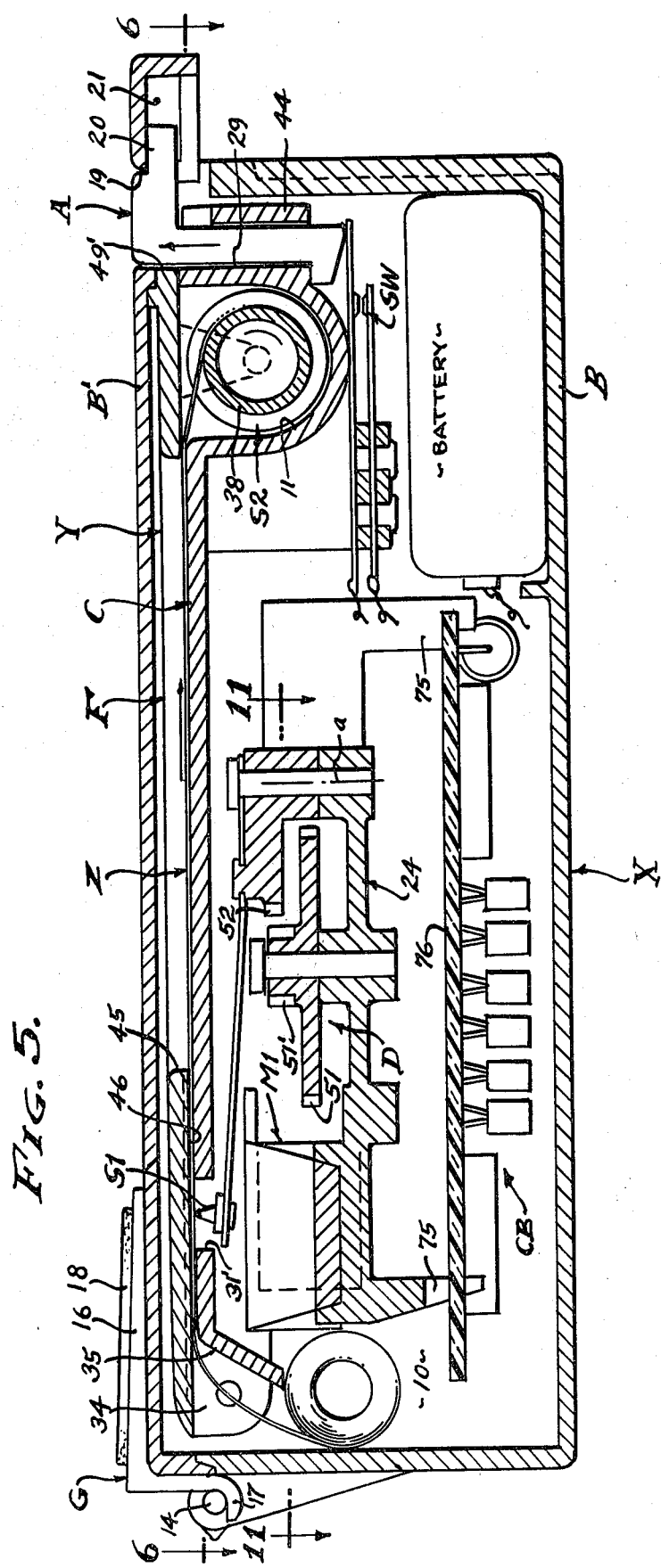
FIG. 5 is an enlarged longitudinal sectional view taken as indicated by line 5—5 on FIG. 1.
Figure 6:
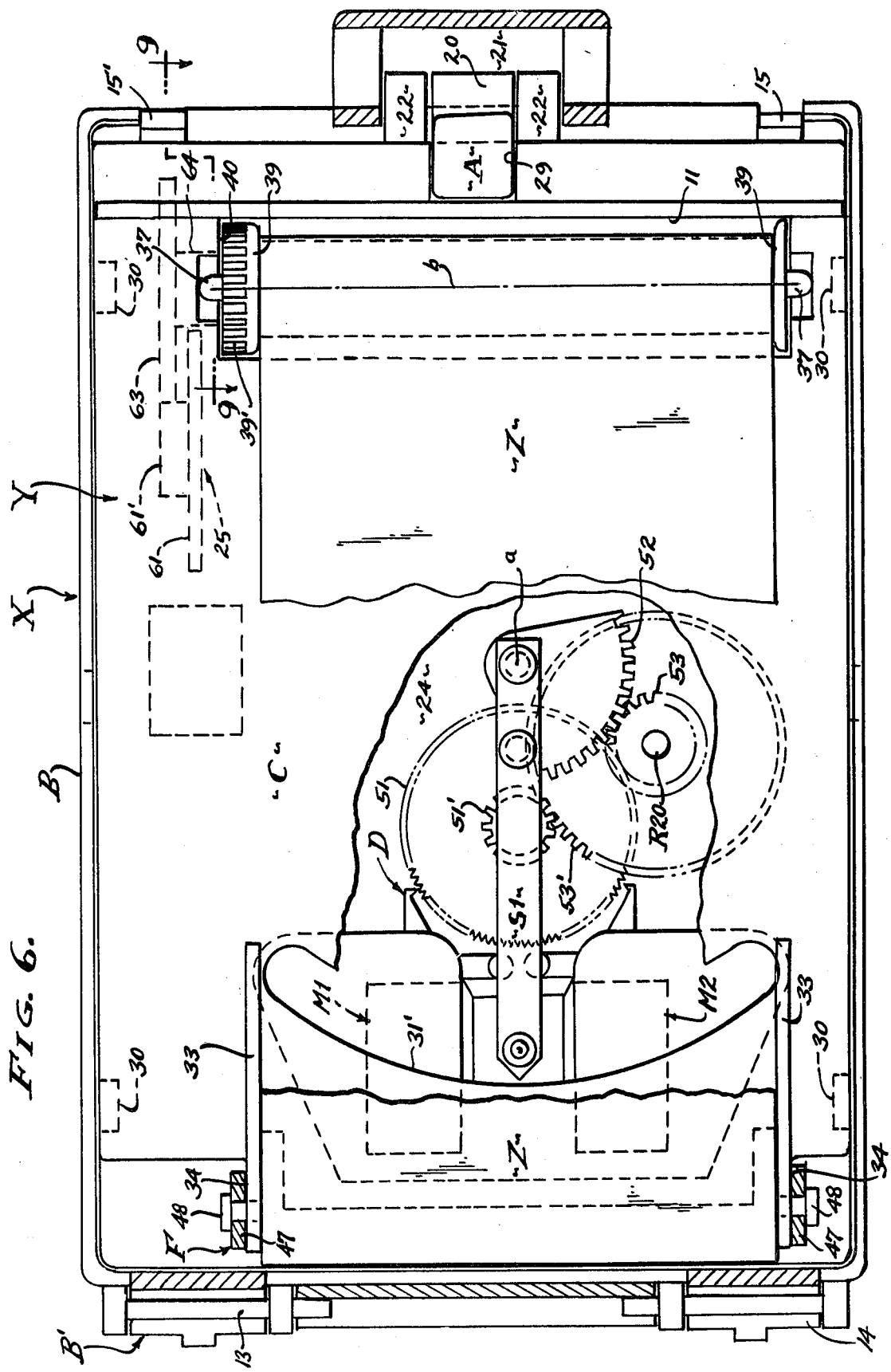
FIG. 6 is a plan sectional view taken as indicated by line 6—6 on FIG. 5.
Figure 11:
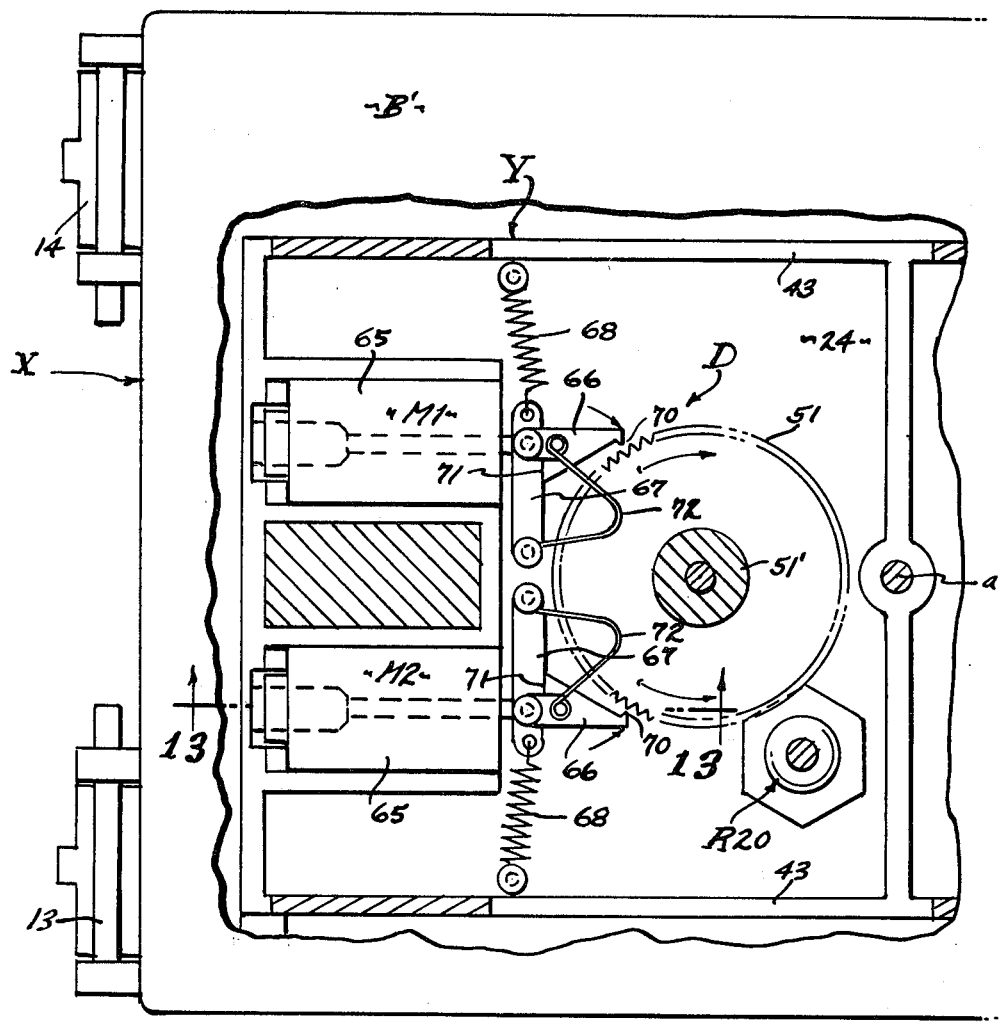
FIG. 11 is a fragmentary sectional view taken as indicated by line 11—11 on FIG. 5.
Figure 12:
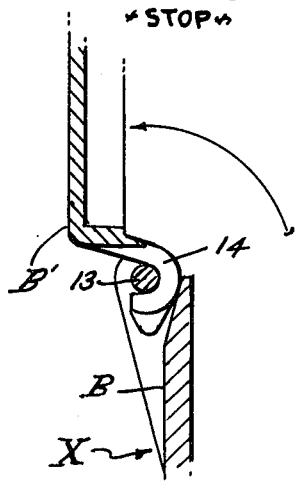
FIG. 12 is a detailed sectional view taken as indicated by line 12—12 on FIG. 3.
Figure 13:
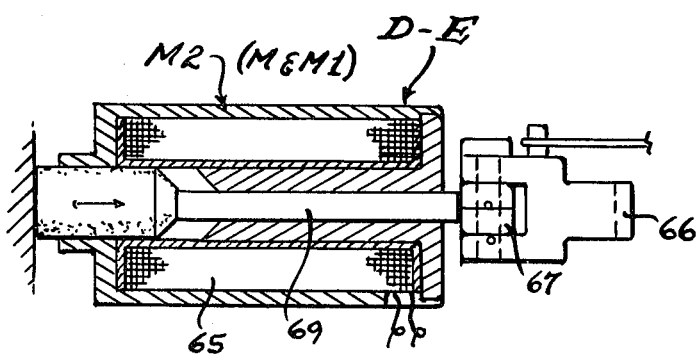
FIG. 13 is an enlarged detailed sectional view, with parts removed from the structure, taken as indicated by line 13—13 on FIG. 11.
Figure 14:
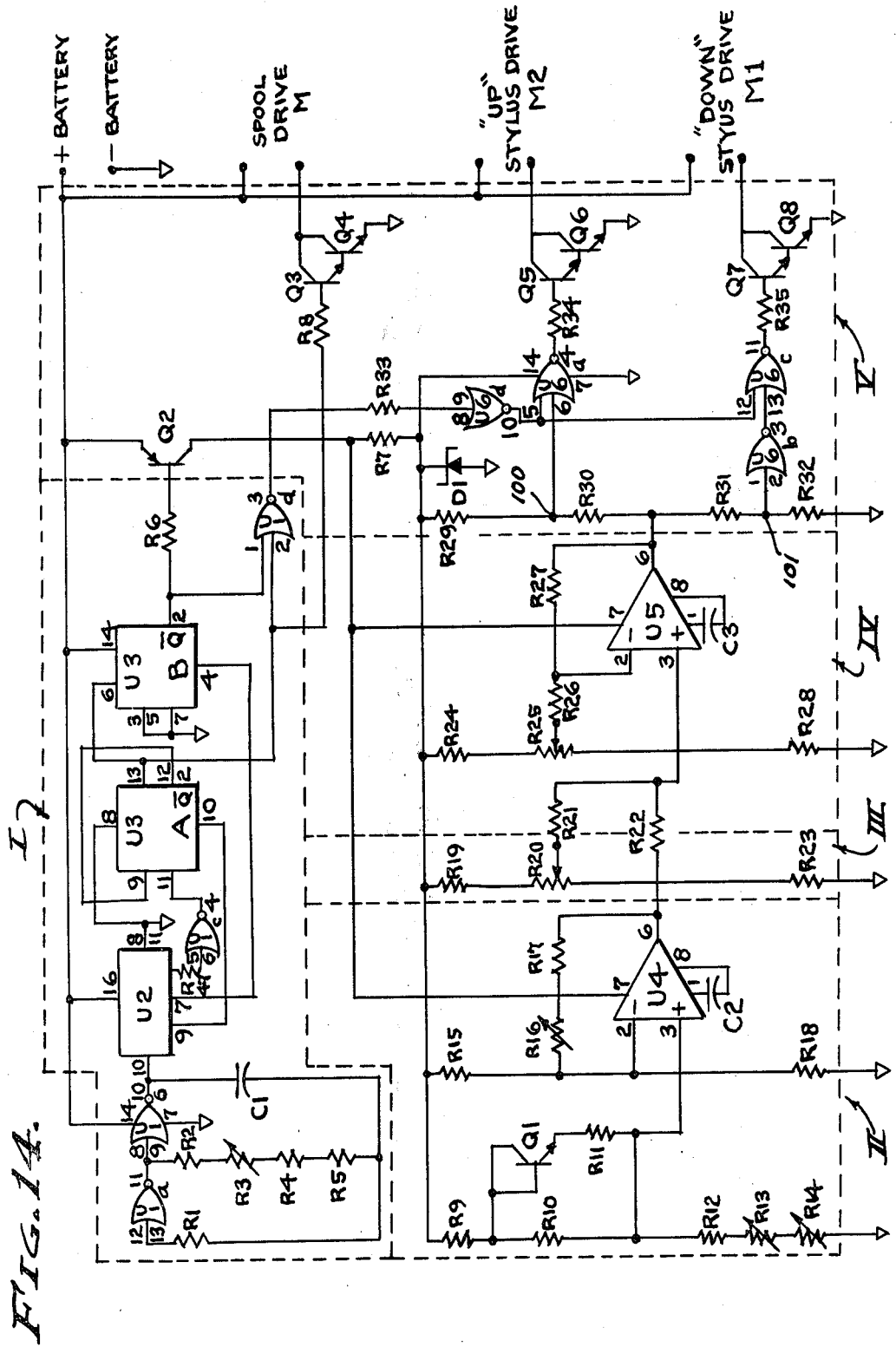
FIG. 14 is a schematic diagram of the electronic circuitry.

Referring to the drawings, the electronic thermograph of the present invention is an electro mechanical instrument that produces a thermogram of time-temperature information. As it is disclosed herein, the instrument is highly reliable and of practical character. Primarily, the instrument is of a moderate size while it processes a generous sized chart, yet is is light in weight and durable, with the exposed parts thereof expendable. As shown, this thermograph involves generally, a container X, an instrument Y replaceable in the container, and a chart Z received and transported by the instrument.

Functionally; the instrument Y is a self sufficient unit into which the chart Z is loaded with a take-up spool S2 to be advanced by a drive E. The chart is protectively captured in working position, face down, by a framer F, that establishes a platten and a chart guideway with the back of the chart exposed through a window for shipper information to be written thereon. The container X and instrument Y are snapped together and cooperatively form a chart supply bin 10 from which the spindled chart paper is withdrawn to pass beneath the platten and to be drawn onto the take-up spool that is captured beneath the framer and journaled in a pocket 11 in a chassis C of the instrument. The said chassis supports a stylus drive means D and the spool drive means E, and to which is attached an electronic circuit board CB that governs all instrument functions.

Operationally; a manually depressible actuator A is carried by the chassis C and exposed through an opening through a box cover B' to close a switch SW, held closed by a strap seal CS until its removal. The electronic circuit is actuated by the closed switch to periodically actuate the spool drive means E and stylus drive means D when required. As shown, the spool drive means E comprises a single ratchet operated stepper wheel and gear means to the spool S2, while the stylus drive means D comprises a double ratchet operated stepper wheel and gear means to the stylus S1. The ratchets are operated by electro-magnets or solenoids that advance pawls retracted by spring means, in the case of the spool drive means to advance the chart attached thereto, and in the case of the stylus drive means to both advance and retract (power-up and power-down) the temperature position of said stylus. Logistically, that is the instrument rental service to shipper and transport to receiver followed by return to said service source of the instrument, this instrument is unique by employing a conventional metal strap "car seal" that is inserted by the shipper to seal the instrument and simultaneously maintain a closed electrical circuit, manually initiated by the shipper in order to insert the said metal strap seal. When the seal is removed by the receiver the circuit is broken, deactivating the instrument for return in the mails. The seal is simply discarded by the receiver.

Electronically; in its preferred embodiment a thermister or a temperature responsive transistor varies a voltage to be compared with the voltage output of a potentiometer positioned by movement of a temperature recording stylus. Battery drain is an important factor, and to this end there is a time base and programmer means I that provides 30 millisecond pulses at two minute intervals to power prime mover means, with the result that the instrument is "ON" but 1/4000 of the total time. A feature of this invention is the cooperative relationship of a temperature sensing transducer means II and a position sensing transmitter means III, the former responsive to surrounding temperature and the latter responsive to position of the stylus S1. When the circuit is activated by said pulse a comparator means IV sums the voltage outputs of the temperature sensing transducer means and position responsive transmitter means. Error detecting discriminator and switch means V then determines the relationship of said voltages, namely the transmitter voltage higher or lower than the temperature sensing transducer voltage, to switch on (momentarily) advance or retract stepper motors that reposition said transmitter and stylus coupled thereto. In practice, the stylus is positioned one degree F per step at said two minute intervals, and each step advances the chart approximately 0.010 inch (⅔ inch per day) in which case a 36 inch chart has a recording duration of about two weeks. Thus, a time base of one minute produces a one week chart; or a time base of four minutes produces a four week chart etc.

Referring now to the container X, there is a box B and a cover B' removably hinged together and to a mounting bracket G, each of which is an injection molded part of plastic material such as high impact styrene. The box B is comprised of a flat imperforate bottom, flat sides and flat ends, with an open top defined by a peripheral seal that mates with a complementary cover B' comprised of a flat imperforate top, flat sides and flat ends; and together establishing a rectangular housing. In practice, the cover B' is shallow and hinged to the deeper box B at the chart supply end thereof and on a transverse axis at the exterior and disposed at the plane of joinder between the box and cover. The hinge pins 13 are carried by reinforcing ears projecting from the end of the box, while upwardly open hinge hooks 14 are carried by the cover to embrace the pins throughout 180° of their lower circumference. The box and cover are snapped closed by corner detents 15 and 15' at the take-up end of the instrument, remote from the hinges and one of which is extended for manual release, and each comprised of windows in the cover receiving laterally projecting lugs carried by resilient fingers projecting upwardly from the box.

The mounting bracket G is installed over the cover B' and is comprised of a plate 16 that overlies a substantial portion of the cover when attached thereto by means of upwardly open hinge hooks 17 carried thereby to embrace opposed hinge lugs 14 projecting inwardly from the spaced ears that carry the hinge pins. The hinge hooks 17 embrace the hinge lugs 14 throughout 90° of their lower circumference to form a foot underlying said lug respectively. The plate 16 is covered with a pressure adhesive 18, such as a tape with a removeable protector or the like, and normally revolves with the cover, and is releasible by 90° revolvement away from the cover. In practice, the adhesive covered plate is placed against a supporting wall with the box and cover hinged thereto by gravity; until removal is desired and effected by rotating the box and cover to a horizontal position where they can be lifted out of the bracket support.

A feature of the box B and the cover B' is the reception of a strap "car seal" that coordinates instrument security and operation. As will be described, the instrument Y includes an actuator A that closes a normally open switch SW, and this switch is centrally located at the take-up end of the instrument between the aforementioned detents 15. The actuator A is manually engageable from the exterior and accordingly the cover is provided with an opening 19 to pass the button thereof which is manually depressible. The actuator A includes a lug 20 that projects into a transverse passage 21 that extends through the end of the cover B', to normally intercept insertion of a seal strap, and to pass the seal strap when the actuator is depressed. As shown, the lug 20 plugs the passage 21 when normally positioned, and it clears the passage when depressed. A closed and secured condition is attained by projection of one or more latch members 22, preferably a pair thereof and one at each side of the lug 20 and disposed in the passage 21 and beneath which the strap seal CS is insertable, only when the actuator is depressed. Consequently, the actuator A is captured in a depressed position until the strap seal CS is removed from the passage by the receiver of the instrument who is authorized to open the same. Any commercially available strap type "car seal" is to be employed, wherein the strap ends are inseparably brought together for visual security following which the seal is severed for removed.

Referring now to the instrument Y, there is the chassis C that carries the stylus drive means D and the spool drive means E, the framer F, and to which the controlling circuit board CB is attached. The chassis C substantially overlies the top opening of the box, being spaced from the hinge end of the box B to establish the chart supply bin 10, the stylus drive means D being characterized by a carrier 24 centered beneath the chassis in a horizontal plane, and the spool drive means E being characterized by a carrier 25 disposed at one side of the chassis in a vertical plane. The carriers 24 and 25 are disposed in said planes with the drive axes thereof normal thereto for revolvement of the stylus S1 and the spool S2 on vertical and horizontal transverse axes respectively. The framer F is hingedly connected to the chassis so as to coextensively overlie the same; and each of these elements C-F is an injection molded part of plastic material such as high impact styrene adapted to be fitted and keyed together and permanently secured one to the other by solvents and/or push pins and the like.

The chassis D is the supporting platform of the instrument and presents a writing surface over which the chart Z is transported and beneath which the electromechanics is housed when the instrument Y as a unit is installed into the container Z. To these ends, the box B is provided with upwardly faced coplanar steps 30 at the opposite inner sides to supportably engage a plate 31 which comprises the closure of the chassis coplanar with the top rim or seal of the box. As shown, there is a pair of steps 30 at each side and between which the box is provided with a slot into which a tenon 32 projects laterally from beneath each side of the plate 31; the sides of the box being deflected for assembly and the tenoned joint welded with solvent for security. The plate 31 presents a table over which the chart Y is drawn onto the spool S2 between spaced guide rails 33 that continue from spaced hinge flanges 34 that depend into the chart bin 10, and between which there is a depressor 35 that depends from the plate to restrain the spindled chart supply and to form a slot through which the chart is both forceably installed and freely withdrawn. Aligned with the guide rails 33 there is a pocket 11 at the remote take-up end of the chassis, that is formed in the plate 31 with upwardly open bearings 36 disposed on a horizontal transverse axis to receive trunnions 37 of the take-up spool S2. The spool is comprised of a right cylinder 38 with flanges 39 to guide the chart Y thereon. As shown, one of said flanges is geared at 39' and is exposed radially to the interior through a window 40 at one end of the pocket 11. Support of the stylus drive means D and spool drive means E is provided for; in the form of one or more downwardly opening sockets 41 adapted to receive complementary plugs on the carrier 24 of means D, and in the form of a shoulder 42 at the window 40 adapted to receive the drive bearing journal of the carrier 25 of means E. In practice, there is a pair of sockets 41 at each side of plate 31, aligned with a reinforcement beam 43 beneath the guide rails 33 respectively.

The actuator A is reciprocably carried by the chassis D between the pocket 11 and end of box B, and is secured thereto by a guide 44 to extend through an opening 29 therein so as to expose the button thereof through the cover opening 19. As shown, the lug 20 of the actuator projects from the chassis to obstructably enter the passage 21, the bottom of the passage being open so that the cover B' can be lifted. The "OFF"-"ON" control of the instrument is attained by the normally open switch SW that is closed by depression of the actuator, preferably a leaf switch mounted horizontally under the pocket 11 and with moveable spring members engaged by the lower end of the actuator. The movement of the actuator A is limited downwardly by the lug 20 engaging over the box B and/or guide 44, and upwardly by a foot engaging beneath the pocket 11; the leaf member of the switch providing the return bias. Switch SW is in the battery circuit to the circuit board CB.

The framer F coextensively overlies the chassis plate 31, to enclose both the pocket 11 and chart bin 10 when in a closed position, and to expose them when in an opened position. As shown, the framer is comprised of marginal members that overlie the plate 31 and forming a window 45 to write through and onto it back of the chart Y. A feature of the invention is the chart bin closure portion of the framer that is extended a substantial distance between the guide rails 33 to form a downwardly faced platen 46 spaced sufficiently from the plate 31 to freely pass the chart Y. The framer F is pivoted to the chassis D by means of hinge ears 47 that depend from the platen 46 to embrace the hinge flanges 34, with coaxial pins 48 pressed into one flange and free to turn in the other respectively. The take-up end margin of the framer forms a spool retaining closure with spaced location posts 49 that position the spool trunnions 37. An opening 49' is provided in the spool closure portion of the framer to align in openings 19 and 29 for manual access of the actuator A, there being lift tabs 50 projecting around said opening 49 and frictionally engage with notches in the box B to releasably retain the framer F in a closed position.

The stylus drive means D carries the stylus S1 and a potentiometer R20 driven therewith by reversely operable stepper motors M1 and M2 responsive to the electronic circuit board CB as later described. As shown, the carrier 24 of means D is a planar member spaced beneath the plate 31 in parallel relation thereto with the stylus S1 operable to sweep horizontally therebetween on an axis a normal to and centered with the chart guideway portion of the plate. An arcuate aperature 31' opens through the plate concentric with axis a and beneath the platen 46, and through which the stylus point extends to engage the pressure sensitive front face of the chart Z. The potentiometer R20 and stylus S1 can be operated on a single shaft, but preferably they are separated by a gear drive in order to obtain optimum advantage of their sweep capabilities respectively. In practice, the stylus sweeps 80° while the potentiometer sweeps 240°, and there is a twelve to one (approximate) reduction to the stylus S1 from a 180 tooth drive wheel 51 that is advanced one step or 2° at a time. Since the chart reads −20° F. to +100° F., each advancement of one step equals a ¼ degree temperature change or correction on the chart. Accordingly, the stylus S1 is journaled on a sixty tooth segment gear 52 driven by a twenty tooth pinion gear 53 journaled on an offset axis drivably engaged on the rotatable potentiometer shaft. A 64 tooth reducer gear 53' is integral with the pinion gear 53 and is meshed with a 15 tooth drive pinion 51' integral with the drive wheel 51. As shown in plan view, the stepper motor M1 advances the stylus S1 when energized with a "power-up" pulse, while the stepper motor M2 retracts the stylus S1 when energized with a "power-down" pulse. Accordingly, the stepper motors M1 and M2 are apposed to the toothed periphery of wheel 51 in opposite directions with respect to rotation, one to step clockwise and the other to step counterclockwise.

The spool drive means E is characteristically a transmission means driven by a stepper motor M responsive to a "power-up" pulse from the electronic circuit board CB as later described. As shown, the carrier 25 of means E is a planar member disposed in a vertical plane beneath one side of the plate 31 with a bearing journal 56 keyed into parallel alignment with the spool axis b by shouldered engagement at 42, secured as by welding or with solvent. Stability of the carrier 25 is established by bridging thereof to one side of the carrier 24 where there is fused engagement, also secured as by welding or with solvent. A gear reduction drive is preferred in order to obtain an incremental 0.010 inch advance by means of a pulse every two minutes, in which case a thirty-six inch chart length records for a two week interval. Other pulse intervals produce varied record time capabilities. In practice, a ½ inch diameter spool cylinder is employed, in which case 720 pulses at two minute intervals advances the chart approximately 1½ inch per day. Accordingly, a 180 tooth drive wheel 61 is advanced one step or 2° at a time, with a twenty-five tooth drive pinion 61' engaging a fifty-three tooth reducer gear 63 having a sixteen tooth drive pinion 64 to engage a thirty tooth spool gear 39'. With 720 pulses per day, the spool S2 is revolved approximately one turn. As shown in side view, the stepper motor M advances the spool S2 when engaged with a "power-up" pulse, the motor being apposed to the toothed periphery of wheel 61 to rotate the same clockwise.

The stepper motors M, M1, and M2 are alike and a description of one will suffice for all. The drive wheels 51 and 61 have 180 teeth, so that one step imposes an angular displacement of 2°. As shown, a 60° triangular tooth form is used and the drive axis of a solenoid 65 is offset parallel to a radial line drawn from said drive wheel so that said drive axis strikes the wheel periphery at an angular position substantially 120° displaced from the said radial line. A pawl 66 is reciprocated into the toothed periphery a distance to advance the wheel one tooth or step per action, the pawl being carried by and stopped against the flat normal face of a lever 67 returned biased by a spring 68 against a drive pin 69 of the solenoid, a non-magnetic drive pin of plastic material having anti-freeze properties. The drive point 70 of pawl 66 is held juxtapositioned to the periphery of the toothed drive wheel 51-61 by a stop 71 thereof biased against the lever 67 by a spring 72, so that the said drive point 70 is engageable with a drive wheel tooth displaced several positions rearward of or within the aforementioned 120° displacement. Thus, the retracted position of the pawl 66 is determined by the retracted stopped position of the solenoid drive pin 69 and rearmost stopped position of the solenoid armature driveably engaged therewith.

Referring now to the electronics and the circuit board CB, the carrier 24 of the stylus drive means D has legs 75 to which the circuit board is attached as a planar element 76 of dielectronic material. The Complimentary Metal Oxide Semiconductors or CMOS system components applied herein can be adversely affected by static electricity, and to this end the printed circuitry of the board is uppermost while the component side faces down. However, servicing of the instrument Y is done with its top plate 31 and overlying framer F down for table support or the like, in which case the electrical components are upwardly disposed for inspection, the printed circuit remaining housed within the confines of the leg 75 and the carrier 24. The total instrument function is to advance the chart Z horologically over a stylus positioned according to temperature, in this concept an electronic thermograph. Accordingly, the circuit board CB provides a pulse frequency to the stepper motor M which causes the chart Z to advance on a time basis, and also provides "up" and "down" pulses to the stepper motors M1 and M2 in order to correct the angular position of the stylus as related to temperature only when required.

In accordance with this invention, the electronic system function is to respond to the surrounding temperature that affects the transducer means II (transistor Q1) so as to cause the transmitter means III (potentiometer R20) to rotate with the stylus S1 to a corresponding angular position, while causing the chart to advance on said time basis. The stylus S1 moves in accordance with the angular positioning of potentiometer R20 and thereby records the temperature sensed by transistor Q1. As hereinabove set forth, the electronic control system involves, generally, the time base and programmer means I that provides a train of pulses which are divided into sequentially spaced power pulses and initiating pulses programmed and set to "power" the system on a time basis and to reset after each pulse interval, the temperature sensing transducer means II, the stylus position sensing transmitter means III, the comparator means IV that sums the voltage outputs of means II and III, and the descriminator and switch means V that responds to an error signal from means IV to correct the position of the transmitter means III and stylus S1 coupled thereto.

The time base and programmer means I involves an oscillator O, a divider U2, an inverter U1c, flip-flops U3A and U3B, a NOR gate U1d, and a switch Q2, all as will be described. The oscillator O is a clock comprised of NOR gates U1a and U1b in circuit with a capacitor C1 and resistor R2 (R3, R4, and R5). The resistor R2 and capacitor C1 are in a series circuit from output pin 11 and input pins 8 and 9 of gates U1a and U1b respectively, the input pins 12 and 13 of gate U1a being connected between said resistor and capacitor with a coupling resistor R1 in said connection. In accordance with the invention, a trimming resistor R3 is employed in series with resistor R2, and padding resistors R4 and R5 employed as shown. The quad gates U1a through U1d are connected to the positive battery voltage (9 volts) at power pin 14 of the chip, while the pin 7 is grounded. The frequency generated is $2^{12}/120$ as determined by capacitor C1, resistor R2 and the balance of resistors R4 and R5 adjusted by resistor R3 to produce a train of pulses at a frequency of substantially 34.133 Hz. It will be apparent that a train of triggering pulses is produced by the oscillator O at the output pin 10 of gate U1b.

The divider U2 is a binary counter having a medium speed of operation (8 Mhz) with twelve stages to be used as circumstances require in setting up the timing pulse, the power pulse and the initiating pulse intervals desired. The divider U2 is connected so as to divide the 34.133 Hz frequency by 4096 and thereby produce a two minute interval timing pulse at the Q12 output pin 1. As shown, the 34.133 Hz triggering pulse is received at the input pin 10 and the battery voltage (9 volts) applied at pin 16, and the ground pins 8 and 11 negatively grounded. The Q12 output pin 1 is connected to the clock pin 11 of flip-flop U3A, through NOR gate U1c employed as an inverter. The divider U2 is also connected so as to provide a half wave interval of 30 milliseconds at Q1 output pin 9 which is connected to the reset pin 10 of flip-flop U3a, and so as to provide a half wave interval of 60 milliseconds at the Q2 output pin 7 which is connected to the reset pin 4 of flip-flop U3B (see timing diagram FIG. 17). The timing signal at pin 1 is used to set the flip-flop U3A, the output of which is used to set flip-flop U3B, next to be described; the values given herein and in the timing diagram FIG. 17 being for a spool drive gear ratio that revolves the spool S2 one turn per 720 pulses.

Flip-flops U3A and U3B are data type flip-flops having set-reset capabilities. As shown, the clock pulse is received by the clock pin 11 of flip-flop U3A, with the set pin 11 of divider U2 connected to ground, and with its data pin 9 connected to the $\overline{Q}2$ output pin 12. The Q pin 13 of flip-flop U3A is then connected to the set pin 6 of flip-flop U3B with the battery voltage (9 volts) applied at pin 14, and the clock pin 3 data pin 5 and ground pin 7 negatively grounded. The $\overline{Q}$ output at pin 2 of flip-flop U3B is used as a power pulse to turn on transistor switch Q2 in order to power the balance of the system for a time interval of 58.59 or nominally 60 milliseconds, while the Q output at pin 13 of flip-flop U3A is used as an initiating pulse for a time interval of 29.29 or nominally 30 milliseconds. The Q1 output pin 9 of divider U2 is applied to reset pin 10 of flip-flop U3A which causes reset 30 milliseconds after being set by the Q12 output pin 1 of divider U2. The Q2 output pin 7 of divider U2 is applied to the reset pin 4 of flip-flop U3B which causes reset 60 milliseconds after being set. Thus, the total power pulse interval is 60 milliseconds. Simultaneously; the Q output pin 13 of flip-flop U3A and the $\overline{Q}$ output of flip-flop U3B are applied to the inputs of NOR gate U1d, so that when flip-flop U3A is reset and flip-flop U3B is set, an initiating pulse of 30 milliseconds duration appears at the output pin 3 of gate U1d. This latter pulse immediately follows the chart drive pulse applied directly from output Q pin 13 of flip-flop U3A to the power switching amplifier Q3-Q4 (a Darlington circuit) for an interval of 30 milliseconds. The PNP switching transistor Q2 operates for a power pulse duration of 60 milliseconds and thereby providing battery voltage to the temperature transducer means II, to the transmitter means III, to the comparator means IV, and to the discriminator and switch means V; with a current limiting resistor R7 going to negative ground through a zenor diode D1, a regulated power supply. The output pin 3 of NOR gate U1d provides an enabling pulse for the discriminator and switch means V to govern the stepper motors M1 and M2 immediately following the initiating chart drive pulse.

The temperature sensing transducer means II is comprised of a temperature responsive NPN transistor Q1 with a trimming resistor R13 (and R14), and an operational amplifier U4 with a gain trimming resistor R16. A characteristic of saturated silicone transistors, as used herein, is that the base-emmitter voltage varies linearly with commensurate variations in temperature applied thereto. Accordingly, transistor Q1 is subjected to the surrounding temperature to be recorded and the resulting voltage employed to govern the servo positioning of the stylus S1. As shown, the battery voltage (9 volts) is applied directly to the power pin 7 of the amplifier U4 and through resistor R7 to the base of transistor Q1 and to the inverting input pin 2 of amplifier U4, through padding resistors R9 and R15 respectively. The emmitter voltage connects to the non-inverting input pin 3 of amplifier U4, and to its base through series resistors R10 and R11 intermediate which the trimming circuit consisting of resistor R12 and the trimming resistor R13 extend to the negative ground. In practice, a pair of trim pots R13 and R14 are used in series, one to fine trim the other. The amplifier trim pot R16 is in series with a padding resistor R17 between the inverting power input pin 2 and signal output pin 6 thereof so as to adjust the gain and in order to provide 0.025 volts per degree F variation at the output pin 6 of said operational amplifier. A compensating capacitor C2 connected between pins 1 and 8 of the amplifier U4 to prevent oscillating, and the battery voltage is applied directly to amplifier U4 at the power pin 7 from switching transistor Q2, while the power voltage is applied to the inverting input pin 2 of the amplifier and to transistor Q1 through the resistor R7. A padding resistor R18 extends to the negative ground from pin 2 of the amplifier.

The position sensing transmitter means III is comprised of the potentiometer R20 coupled to the sylus S1 to move therewith with its resistance element in series between the positive battery voltage and negative ground. In practice, padding resistors R19 and R23 are in the two resistance leads in the power circuit extending from resistor R7 to ground. The position responsive voltage is then taken from the wiper of the potentiometer, as shown.

The comparator means IV is comprised of summing resistors R21 and R22, and an operational amplifier U5 with a trimming potentiometer R25. The resistors R21 and R22 are connected from the wiper of potentiometer R20 and temperature transducer amplifier output pin 6 respectively. The summation of these two resistors connects to the non-inverting input pin 3 of amplifier U5, while a calibrating potential extends from the trim pot R25 through a balancing resistor R26 and to the inverting input pin 2 of amplifier U5. The battery voltage is applied directly to amplifier U5 at pin 7. A gain control resistor R27 is connected between the inverting input pin 2 and output pin 6, and a compensating capacitor C3 is connected between pins 1 and 8 of the amplifier U5 to prevent oscillating. The balanced condition of the comparator means is chosen to prevail when the output voltage of amplifier U5 equals one half of the regulated supply or substantially 3 volts, at which condition the angular position of the stylus S1 and corresponding voltage transmitted by the potentiometer R20 matches the amplified voltage of transistor Q1. The output at pin 6 of amplifier U5 is the error signal that determines whether or not the stylus S1 requires repositioning, and if so "up" or "down".

The discriminator and switch means V is comprised of a network of resistors R29, R30, R31, and R32, NOR gates U6a, U6b, U6c, and U6d, and NPN transistor switches Q5 and Q6, and Q7 and Q8. The said resistor network is an error detector that establishes a dead band of, for example ±1° F. As shown, the resistors R30 and R29 extend in series from output pin 6 of amplifier U5 to the positive voltage from switching transistor Q2, with a junction 100 therebetween. The resistors R31 and R32 extend in series from output pin 6 of amplifier U5 to the negative voltage at ground, with a junction 101 therebetween. When the system is at balance, a voltage of 3.0+0.6=3.6 volts occurs at junction 100, while 3.0−0.6=2.4 volts occurs at junction 101. These voltage offsets together with the gain of amplifier U5 as established by gain control resistor R27 creates the above prescribed dead band.

The voltage from junction 100, for example 3.6 volts, is applied to one input pin 6 of NOR gate U6a and is seen there as a logic "1"; while the voltage from junction 101, for example 2.4 volts, is applied to the input pins 1 and 2 of inverter NOR gate U6b from which the inverted signal eminates from pin 3 to pin 13 of NOR gate U6c. During the latter half of the power pulse, an "enabling" pulse from the time base and programmer means I is applied as a logic "1" to pins 8 and 9 of inverter NOR gate U6d from which the inverted signal eminates from pin 10 as a logic "0" to pin 5 and pin 12 of NOR gate U6a and NOR gate U6b respectively. The quad gates U6a through U6d are connected to the power pulse switching transistor Q2 through current regulating resistor R7 at power pin 14 of the chip, while the pin 7 is grounded. When the enabling pulse occurs and the output pin 6 of amplifier U5 is less than 3.6 volts, the voltage at junction 100 will be less than 3 volts and a logic "0" will appear at the input pin 6 of NOR gate U6a with the result that the output pin 4 will go to a logic "1", and this turns on the NPN transistor switch Q5-Q6 (a Darlington circuit) for the duration of the enabling pulse at junction 100 or the "error" signal, which ever is shorter in time. Alternately, when the enabling pulse occurs and the output pin 6 of amplifier U5 is more than 2.4 volts, a logic "1" will appear at the output pin 11 of NOR gate U6a, and this turns on the NPN transistor switch Q7-Q8 (a Darlington circuit) for the duration of the enabling pulse applied to gate U6d or the "error" signal from pin 6 of amplifier U5, which ever is shorter in time.

The 29.29 millisecond (30 ms) initiating pulse signal from pin 13 of flip-flop U3A is applied directly to and turns on the NPN transistor switch Q3-Q4 during the first half of the power pulse from pin 2 of flip-flop Q3B, energizing the stepper motor M at two minute intervals. The inverted pulse signal from pin 3 of NOR gate U1d is applied immediately following by means of the $\overline{Q}$ pin 2 connection to input pin 1 of gate U1d to enable the discriminator and switch means IV during the second half of the power pulse for turning on either of the NPN transistor switches Q5-Q6 or Q7-Q8 energizing of stepper motors M1 or M2. An effective "error" signal appears at pin 6 of amplifier U5 only when an angular displacement representing more than 1° F. is present at the transmitter potentiometer R20.

The electronic circuit board CB as it is hereinabove described is assembled of commercially available components, with trimming resistors and/or potentiometers for establishing functional accuracy and calibration related to temperature. To these ends there are the variable resistors R3, R13, R14, R16, and potentiometer R25; first, to adjust the time base; second, to adjust the temperature transducer voltage and amplifier gain; third, to adjust the amplifier gain; fourth, to calibrate the transmitter and stylus for a correct temperature position; fifth, to test for stylus drive operation; and sixth, to test for chart drive operation.

In order to make the first adjustment, of the oscillator O, a 9 volt battery voltage is applied as shown, and the trimming resistor R3 is adjusted until a frequency of 34.133 Hz appears at gate U1b pin 10.

In order to make the second adjustment, namely the transducer voltage and amplifier gain, the transistor switch Q2 is shorted by connecting its emmitter and collector so that there is a steady battery voltage to the regulated power supply, and by connecting a voltmeter between the amplifier U4 output pin 6 and input pin 2. A known arbitrary voltage of approximately 0.5 volts is then connected between the emmitter and base of the temperature sensing transistor Q1 (+ to base and − to emitter) whereupon the trimming resistors R13 and R14 are adjusted for a readout of zero volts on said voltmeter.

In order to adjust the gain of amplifier U4, the said voltmeter is removed and reconnected between the output pin 6 of amplifier U4 and the wiper of potentiometer R25, and (a) said potentiometer adjusted for a zero volt readout. (b) The calibration voltage applied between the emitter and base of the temperature sensing transistor Q1 is then reduced by precisely 0.010 volts. (c) Trimming resistor R16 is then adjusted so that said voltmeter readout is 0.140 to 0.176 volts, (d) and the calibration voltage of 0.010 restored to transistor Q1. The foregoing steps (a) through (d) are repeated several times until the step (d) produces a voltmeter readout of zero.

In order to calibrate the transmitter and stylus for a correct temperature position, the said voltmeter is removed and reconnected between the output pin 6 of amplifier U4 and the negative ground, and the calibrating voltage is removed permanently from transistor Q1. The trimming resistors R13 and R14 are then readjusted so that the said voltmeter indicates precisely 3.00 volts, during which the temperature responsive resistor Q1 is subjected to precisely +40° F. In practice, 0.025 volts is added for each temperature degree above said 40° F. at which the unit is being calibrated. For example, at 70° F. the calibration voltage will be 3.75 volts.

In order to test the stylus drive for operation, a simulating enable pulse is applied to pins 8-9 of gate U6a at a conviently repeated rate as circumstances require. The trimming potentiometer R25 is then readjusted up and down so that the transmitter and stylus moves to positions above and below, and finally to a position representing the exact temperature to which transistor Q1 is adjusted.

In order to test the chart drive for operation, the said simulating enabling pulse is applied to the base of transistor switch Q3, and the stepper motor M operated.

Finally, and in order to operate the finished instrument, all of the aforementioned test connections are removed, except for the 9 volt battery power supply. The stylus S1 can be moved into an error position in either direction, in which case the chart drive stepper motor M is operated at two minute intervals, and the stylus drive stepper motors M1 or M2 operated immediately following, and this function repeated until the stylus reaches a position indicating the temperature to which the temperature responsive transistor Q1 is subjected.

From the foregoing it will be seen that we have provided a self sufficient and entirely portable thermograph that is automatically put into and out of operation by means of installing and removing a seal strap that assures closure and continued operation of the instrument. The instrument is an electro-mechanical unit that is replaceable in an expendable container, substantially all mechanical parts being made of injection molded plastic, with the exception of fasteners and springs and the like. Electronically, the circuit functions are clearly illustrated in the timing diagram of FIG. 17 wherein the timed relationship of the various pulses are shown throughout a typical time period of 120 seconds, with the resulting functional pulses following the end of each time period. As shown, a clock is provided in the oscillator O that produces the continuous 34.133 Hz triggering pulse at gate U1b pin 10. The counter U2 divides the triggering pulse into three pulses of distinct duration, a 30 millisecond pulse at Q1 pin 9, a 60 millisecond pulse at Q2 pin 7, and a two minute pulse at Q12 pin 1. The three aforesaid pulses are programmed by the flip-flops U3A and U3B so as to attain the three functional pulses that are distinctly related in time so as to control the stepper motor M, and the stepper motors M1 and M2 through the temperature-position comparator means, the discriminator means, and the switching means above described. As shown, at the start of each two minute interval there is a 30 millisecond pulse at Q pin 13 of flip-flop U3A and a 60 millisecond pulse at $\overline{Q}$ pin 2 of flip-flop U3B, followed 30 milliseconds after said start by a 30 millisecond pulse at U1d pin 3 that terminates simultaneously with said 60 millisecond pulse. As hereinabove described, these pulses affect the transistor switch means to periodically power up the circuit and the chart drive stepper motor M, and affect the stylus drive stepper motors M1 and M2 through the quad gates U6a-U6b to "up" and "down" the position of the temperature recording stylus S1.

Having described only a typical preferred form and application of our invention, we do not wish to be limited or restricted to the specific details herein set forth, but wish to reserve to ourselves any modifications or variations that may appear to those skilled in the art:

I claim:

1. A chart drive for a thermograph wherein a take-up spool is revolved by motor drive means, and including, a chassis having an upwardly open pocket to receive the spool and over which the chart is guided onto the spool, the spool being rotatably journaled in the chassis and having a gear configuration at one end thereof, a spool drive carrier depending from the chassis at said one end of the spool having said gear configuration, the carrier being keyed into alignment with the spool by shouldered engagement with the chassis, and a motor drive means mounted to the carrier and comprised of a motor coupled to a drive gear on an axis spaced from and parallel to the spool and engaging the spool gear configuration, there being a window through the upwardly open pocket exposing the spool gear configuration to engageably mesh with said drive gear.

2. The thermograph chart drive as set forth in claim 1, wherein the spool gear configuration is disengageably meshed with the said drive gear.

3. The thermograph chart drive as set forth in claim 1, wherein the drive means includes a small diameter pinion drive gear driven thereby and entered into said window to engageably mesh with the spool gear configuration.

4. The thermograph chart drive as set forth in claim 1, wherein the drive means includes a small diameter pinion drive gear driven thereby and entered into said window to disengageably mesh with the spool gear configuration.

5. The thermograph chart drive as set forth in claim 1, wherein the chassis has a depending portion to form said upwardly open pocket to receive the spool, trunnions projecting from opposite ends of the spool, there being a trunnion bearing in the chassis at one end of the pocket to support a trunnion of the spool, the window through said pocket being at the other end of the pocket and having shouldered engagement with a bearing block of the carrier, there being a trunnion bearing in the bearing block to support a trunnion of the spool and to expose the spool gear configuration to engageably mesh with the said drive gear.

6. The thermograph chart drive as set forth in claim 1, wherein the chassis has a depending portion to form said upwardly open pocket to receive the spool, trunnions projecting from opposite ends of the spool, there being a trunnion bearing in the chassis at one end of the pocket to support a trunnion of the spool, the window through said pocket being at the other end of the pocket and having shouldered engagement with a bearing block of the carrier, there being a trunnion bearing in the bearing block to support a trunnion of the spool and to expose the spool gear configuration to disengageably mesh with the said drive gear.

7. The thermograph chart drive as set forth in claim 1, wherein the chassis has a depending portion to form said upwardly open pocket to receive the spool, trunnions projecting from opposite ends of the spool, there being a trunnion bearing in the chassis at one end of the pocket to support a trunnion of the spool, the window through said pocket being at the other end of the pocket and having shouldered engagement with a bearing block of the carrier, there being a trunnion bearing in the bearing block to support a trunnion of the spool and to expose the spool gear configuration, and wherein the drive gear and motor underly the chassis at the window end of the upwardly open pocket, and a small diameter pinion drive gear driven thereby and entered into said window to engageably mesh with the spool gear configuration.

* * * * *